United States Patent
Huang

(10) Patent No.: US 10,145,643 B1
(45) Date of Patent: Dec. 4, 2018

(54) COMPOSITE TUBE FOR AN ARCHERY BOW LIMB OR ARROW SHAFT

(71) Applicant: Dorge O. Huang, Henry, IL (US)

(72) Inventor: Dorge O. Huang, Henry, IL (US)

( * ) Notice: Subject to any disclaimer, the term of this patent is extended or adjusted under 35 U.S.C. 154(b) by 0 days.

(21) Appl. No.: 15/903,247

(22) Filed: Feb. 23, 2018

(51) Int. Cl.
| | |
|---|---|
| *F42B 6/04* | (2006.01) |
| *F41B 5/00* | (2006.01) |
| *B32B 1/08* | (2006.01) |
| *F41B 5/14* | (2006.01) |
| *F16L 9/14* | (2006.01) |
| *B29C 65/00* | (2006.01) |
| *F41B 5/10* | (2006.01) |

(52) U.S. Cl.
CPC ........ *F41B 5/1403* (2013.01); *B29C 66/7212* (2013.01); *B32B 1/08* (2013.01); *F16L 9/14* (2013.01); *F41B 5/00* (2013.01); *F42B 6/04* (2013.01); *B32B 2250/04* (2013.01); *F41B 5/10* (2013.01)

(58) Field of Classification Search
CPC ...... F41B 5/00; F41B 5/14; F42B 6/02; F42B 6/04; B29L 2023/00; B32B 1/08; B32B 15/08
See application file for complete search history.

(56) References Cited

U.S. PATENT DOCUMENTS

| | | | |
|---|---|---|---|
| 6,179,736 B1 * | 1/2001 | Thurber | F42B 6/04 473/578 |
| 6,866,599 B2 * | 3/2005 | Eastman, II | F42B 6/04 428/36.91 |
| 7,608,002 B2 * | 10/2009 | Eastman, II | F42B 6/04 473/578 |
| 8,579,739 B2 * | 11/2013 | Song | F42B 6/04 473/578 |
| 8,776,770 B2 | 7/2014 | Batdorf | |
| 2003/0013565 A1 * | 1/2003 | Song | F42B 6/04 473/578 |
| 2003/0073524 A1 * | 4/2003 | Song | F42B 6/04 473/578 |
| 2006/0084534 A1 * | 4/2006 | Flowers | F42B 6/04 473/578 |

* cited by examiner

*Primary Examiner* — John Ricci
(74) *Attorney, Agent, or Firm* — Donald J. Ersler

(57) ABSTRACT

A composite tube for an archery bow limb or arrow shaft preferably includes a first fiber sheet with fibers parallel and substantially perpendicular to a lengthwise axis of the composite tube; a second fiber sheet with fibers parallel to the lengthwise axis; a third fiber sheet with fibers oriented substantially 45 degrees from the lengthwise axis; and fourth fiber sheet with fibers parallel and substantially perpendicular to the lengthwise axis. The first fiber sheet is wrapped around a mandrill; the second carbon fiber sheet is wrapped around the first fiber sheet; the third fiber sheet is wrapped around the second fiber sheet; and the fourth fiber sheet is wrapped around the third fiber sheet. The mandrill with the first, second, third and fourth fiber sheets is baked in an autoclave. The spacing between fibers in the first, second, third and fourth carbon fiber sheets may be the same or different.

20 Claims, 6 Drawing Sheets

COMPOSITE TUBE FOR AN ARCHERY BOW LIMB OR ARROW SHAFT

BACKGROUND OF THE INVENTION

1. Field of the Invention

The present invention relates generally to archery and more specifically to a composite tube for an archery bow limb or arrow shaft, which is resistant to torsion about a lengthwise axis of the composite tube.

2. Discussion of the Prior Art

A composite tube is fabricated from fiber sheets. Resin in the fiber sheets binds the fiber into a tubular shape, after being heated. The fibers in the fiber sheet could be carbon, boron, ceramic, titanium, fiberglass, Kevlar, Spectra, Dyneema or any other suitable material. U.S. Pat. No. 8,776,770 to Batdorf discloses a bow with adjustable limbs. However, it appears that the prior art does not teach or suggest the use of a unique combination of fiber sheet weave patterns in a composite tube, which are resistant to torsion about an axis of the composite tube.

Accordingly, there is a clearly felt need in the art for a composite tube for an archery bow limb or arrow shaft, which includes a unique combination of fiber weave patterns that make the composite tube resistant to torsion about a lengthwise axis thereof, while allowing the composite tube to bend or flex about its lengthwise axis.

SUMMARY OF THE INVENTION

The present invention provides a composite tube for an archery bow limb or arrow shaft, which is resistant to torsion about a lengthwise axis of the composite tube. The composite tube for an archery bow limb or arrow shaft (composite tube) preferably includes a combination of at least four fiber sheets with different weave patterns, which have the unexpected result of resisting torsion about a lengthwise axis thereof, while allowing the composite tube to bend or flex about its lengthwise axis. The composite tube preferably includes a first fiber sheet with fibers parallel and substantially perpendicular to a lengthwise axis of the composite tube; a second fiber sheet with fibers parallel to the lengthwise axis; a third fiber sheet with fibers oriented at substantially 45 degrees relative to the lengthwise axis; and fourth fiber sheet with fibers parallel and substantially perpendicular to the lengthwise axis. The first fiber sheet is wrapped around a mandrill; the second carbon fiber sheet is wrapped around the first fiber sheet; the third fiber sheet is wrapped around the second fiber sheet; and the fourth fiber sheet is wrapped around the third fiber sheet. The mandrill with the first, second, third and fourth fiber sheets is baked in an autoclave. The spacing between fibers in the first, second, third and fourth carbon fiber sheets may be the same or different. The fiber sheets preferably have carbon fibers, but other fibers, such as boron, ceramic, titanium, fiberglass, Kevlar, Spectra, Dyneema may also be used.

The composite tube may be used as an arrow shaft. At least one composite tube may be used to construct an archery bow limb. The archery bow limb preferably includes a first limb tube, a second limb tube, a first cam block and a second cam block. The archery bow may also be a crossbow. Two riser tube holes are formed in a riser of an archery bow to receive one end of the first and second limb tubes. Each cam block includes a tube hole, which is sized to receive the other end of the first and second limb tubes. An axle hole is formed perpendicular to the tube hole to receive one end of a cam axle. Each end of the first and second composite tubes is preferably secured in the riser tube holes and tube holes with adhesive or the like. The first and second cam blocks may be fabricated from a carbon material, a plastic material, a lightweight metal or any other suitable material. A soft metal sleeve may be inserted into the axle hole of the composite and plastic materials for added strength.

A second embodiment of the composite tube limb preferably includes a first limb tube, a second limb tube and a cam bracket. Two riser tube holes are formed in a riser of the archery bow to receive one end of the first and second limb tubes. The cam bracket preferably includes a tube base and an axle plate. The axle plate extends outward from the tube base. Two tube holes are formed in the tube base to receive the other end of the first and second limb tubes. An axle hole is formed through axle plate, perpendicular to the two tube holes to retain one end of a cam axle. Each end of the first and second composite tubes is preferably secured in the riser tube holes and tube holes with adhesive or the like. The cam bracket may be fabricated from a carbon material, a plastic material, a lightweight metal or any other suitable material. A soft metal sleeve may be inserted into the axle hole of the carbon and plastic materials for added strength Accordingly, it is an object of the present invention to provide a composite tube for an archery bow limb or arrow shaft, which includes a unique combination of fiber weave patterns that makes the composite tube resistant to torsion about a lengthwise axis thereof, while allowing the composite tube to bend or flex about its lengthwise axis.

These and additional objects, advantages, features and benefits of the present invention will become apparent from the following specification.

BRIEF DESCRIPTION OF THE DRAWINGS

FIG. 4A is a cross sectional view of two composite tubes with a first natural bend of a first limb oriented to face two opposing composite tubes with a first natural bend of a second limb of an archery bow in accordance with the present invention.

DETAILED DESCRIPTION OF THE PREFERRED EMBODIMENTS

Figure 1:
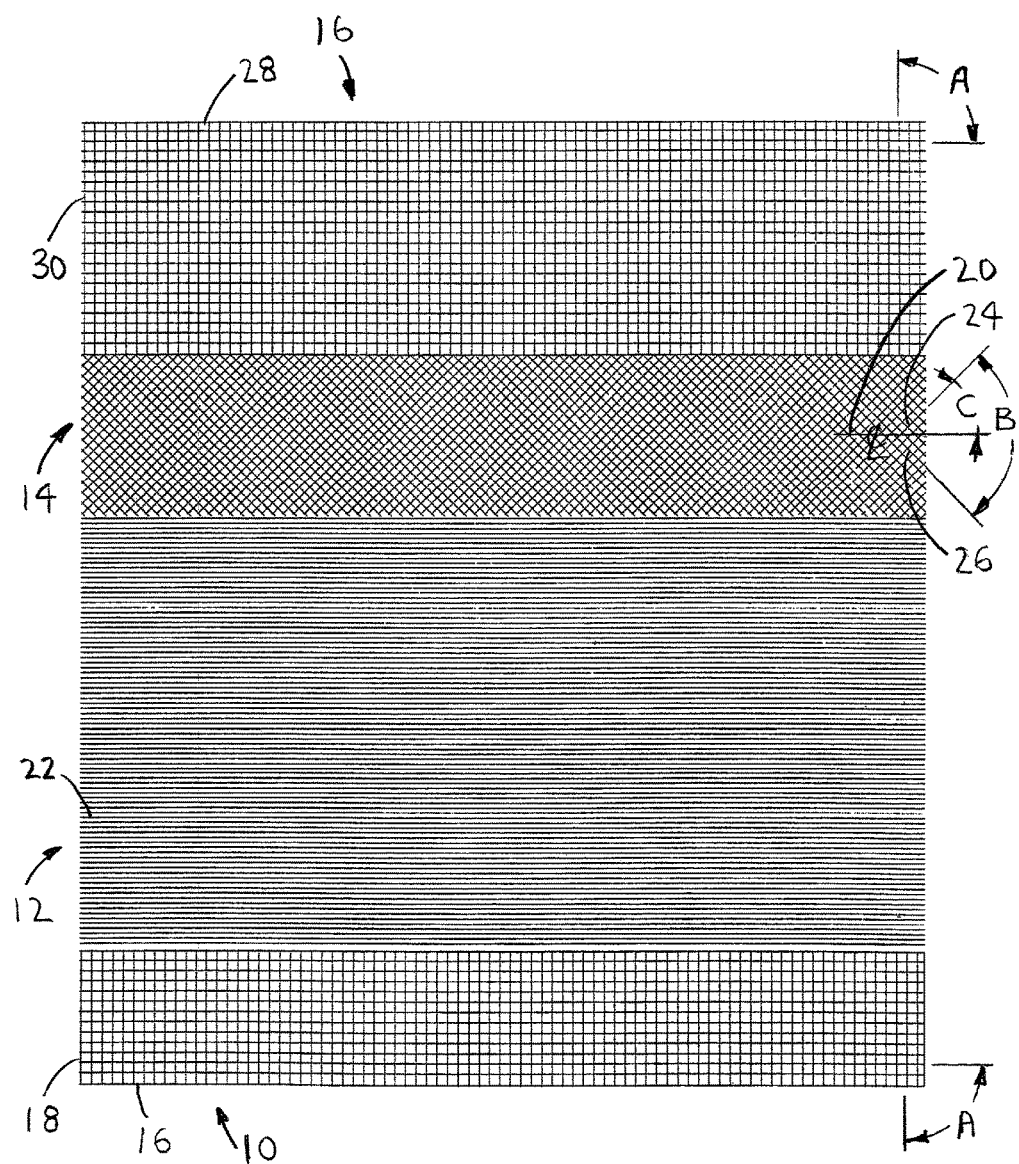
FIG. 1 is a top view of four fiber sheets for fabrication of a composite tube in accordance with the present invention.
Figure 2:
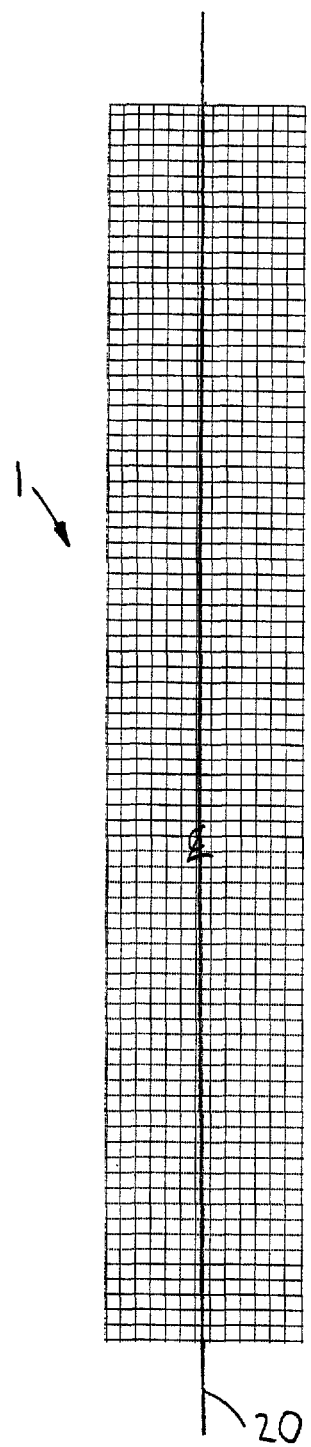
FIG. 2 is a top view of four fiber sheets wrapped on a mandrill, before baking in an autoclave in accordance with the present invention.
Figure 3:
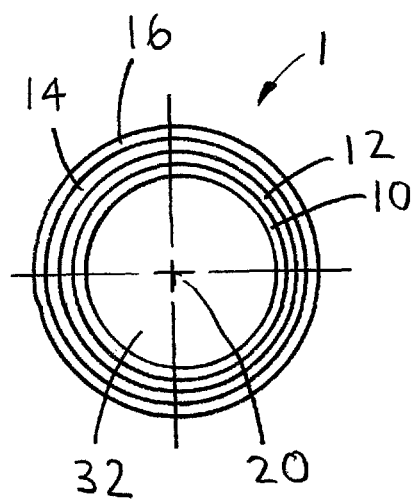
FIG. 3 is an enlarged end view of four fiber sheets wrapped on a mandrill, before baking in an autoclave in accordance with the present invention.

With reference now to the drawings, and particularly to FIG. 1, there is shown a top view of four fiber sheets 10, 12, 14, 16. With reference to FIGS. 2-3, a composite tube 1 preferably includes the first fiber sheet 10, the second fiber sheet 12, the third fiber sheet 14 and the fourth fiber sheet 16. The first fiber sheet 10 includes a cross weave pattern of a plurality of fibers 16, 18. A first axis of the plurality of fibers 16 of the first fiber sheet 10 are aligned to be parallel to a lengthwise axis 20 of the composite tube 1. A second axis of the plurality of fibers 18 of the fiber sheet 10 cross the plurality of fibers 16 at an angle "A." Angle "A" has a value of about 90 degrees. The second fiber sheet 12 includes a straight pattern of fibers 22, which are parallel to the lengthwise axis 20 of the composite tube 1.

The third fiber sheet 14 includes a cross weave pattern of carbon fibers 24, 26, which cross each other at an angle "B" of about 90 degrees. A first axis of the carbon fibers 24 and a second axis of the carbon fibers 26 of the third fiber sheet 14 have an angle "C" relative to the lengthwise axis 20 of the composite tube 1. Angle "C" has a value of about 45 degrees. The fourth fiber sheet 16 includes a cross weave pattern of a plurality of fibers 28, 30. A first axis of the plurality of fibers 28 of the fourth fiber sheet 16 are aligned to form the lengthwise axis 20 of the composite tube 1. A second axis of the plurality of fibers 30 of the fiber sheet 10 cross the plurality of fibers 28 at the angle "A." The angle "A" has a value of about 90 degrees.

The spacing between fibers in the first, second, third and fourth carbon fiber sheets 10, 12, 14, 16 may be the same or different. The fiber sheets 10, 12, 14, 16 preferably have carbon fibers, but other fibers, such as boron, ceramic, titanium, fiberglass, Kevlar, Spectra, Dyneema may also be used. With reference to FIG. 3, the first fiber sheet 10 is wrapped around a mandrill 32; the second fiber sheet 12 is wrapped around the first fiber sheet 10; the third fiber sheet 14 is wrapped around the second fiber sheet 12; and the fourth fiber sheet 16 is wrapped around the third fiber sheet 14. The mandrill 32 with the first, second, third and fourth fiber sheets 10, 12, 14, 16 is baked in an autoclave.

Figure 4:
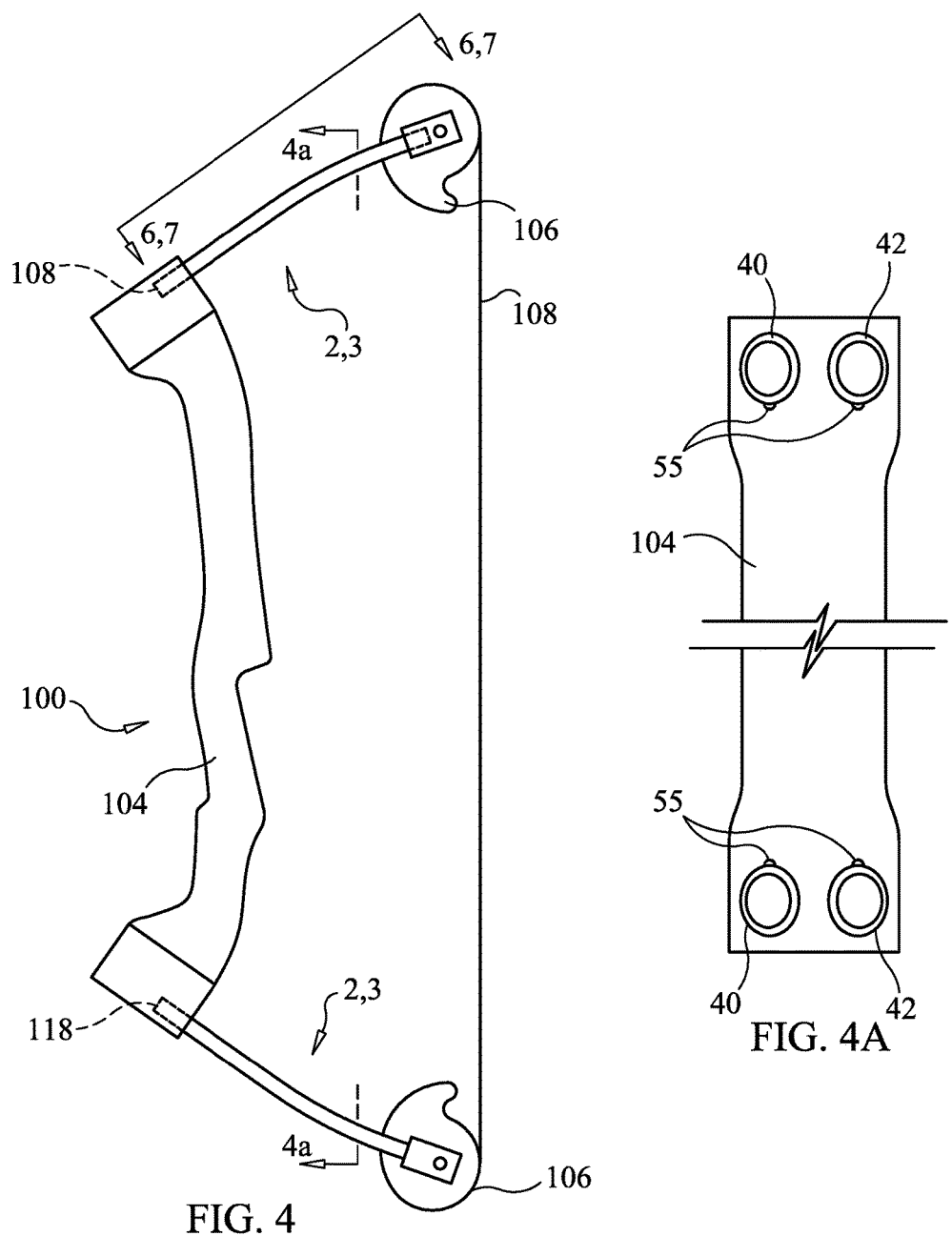
FIG. 4 is a side view of an archery bow with two limbs, each limb having at least one composite tube in accordance with the present invention.
Figure 5:
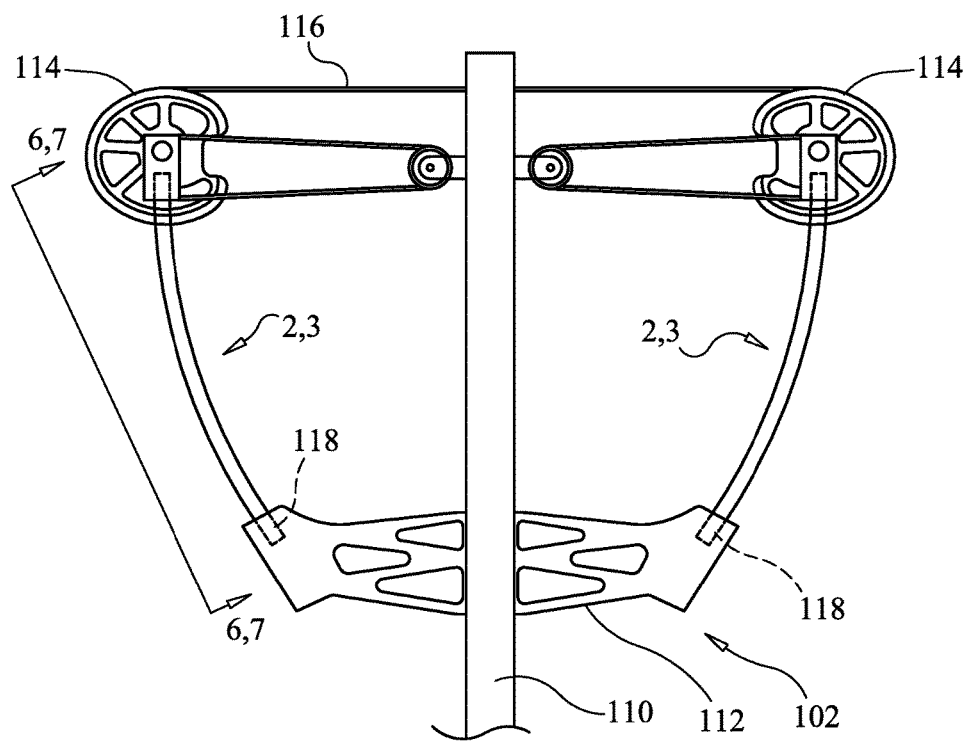
FIG. 5 is a top view of a crossbow having an archery bow limb with at least one composite tube in accordance with the present invention.
Figure 6:
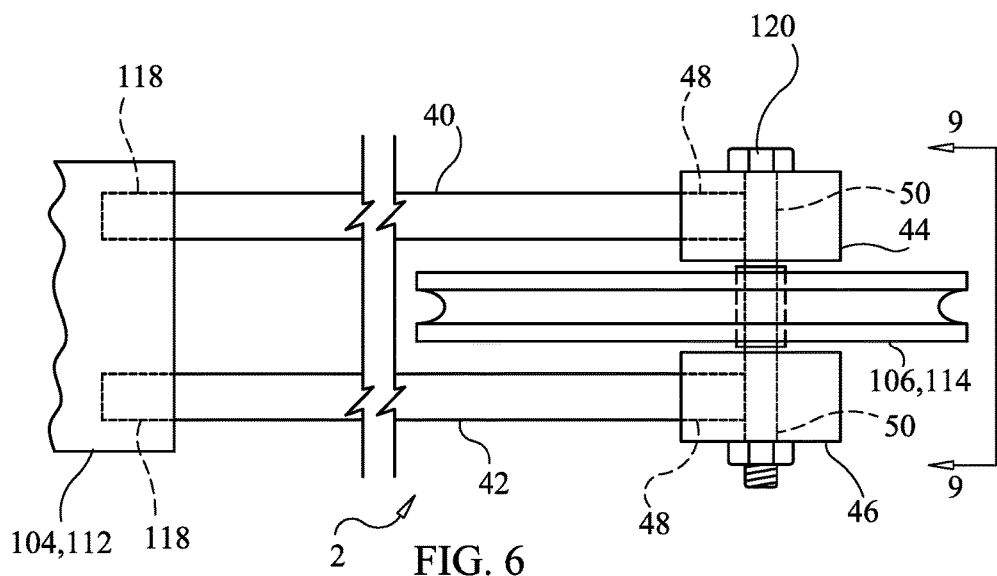
FIG. 6 is an enlarged partial top view of an archery bow limb having at least one composite tube in accordance with the present invention.
Figure 7:
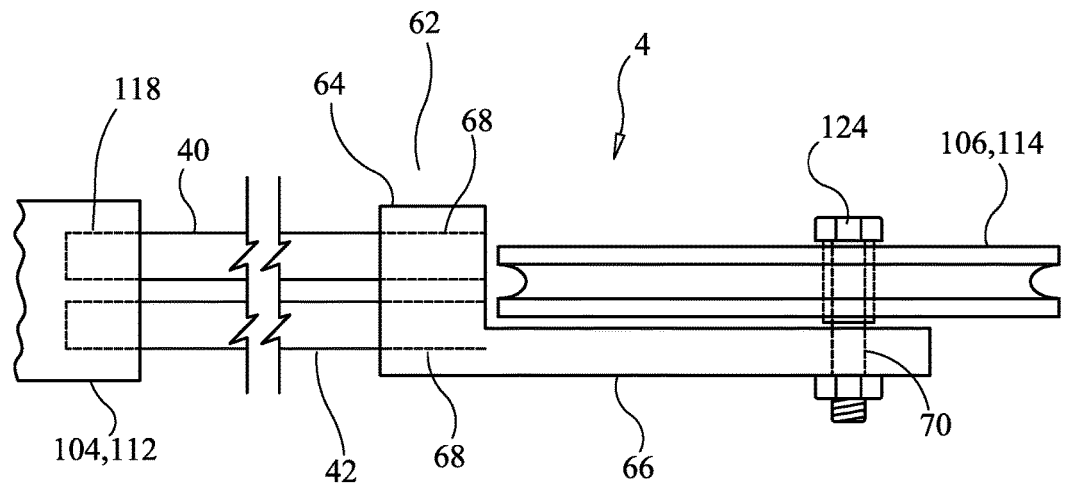
FIG. 7 is a top view of a second embodiment of an archery bow limb having at least one composite tube in accordance with the present invention.

With reference now to the drawings, and particularly to FIG. 4, there is shown a side view of an archery bow 100 with two bow limbs having at least one composite tube 2. The archery bow 100 further includes a riser 104, two cams 106 and a drawstring 108. With reference to FIG. 5, the archery bow may also be a crossbow 102. The crossbow 102 further includes a barrel 110, a riser 112, two cams 114 and a drawstring 116. With reference to FIGS. 6 and 7, the archery bow limb having at least one composite tube 2 preferably includes a first limb tube 40, a second limb tube 42, a first cam block 44 and a second cam block 46. Two riser tube holes 118 are formed in the riser 104, 112 of the archery bow 100, 102 to receive one end of the first and second limb tubes 40, 42. Each cam block (cam bracket) 44, 46 includes a tube hole 48, which is sized to receive the other end of the first and second limb tubes 40, 42. An axle hole 50 is formed perpendicular to the tube hole 18 to receive a cam axle 120. Each end of the first and second composite tubes 40, 42 is preferably secured in the riser tube holes 118 and tube holes 48 with adhesive or the like. The first and second cam blocks 44, 46 may be fabricated from a composite material, a plastic material, a lightweight metal or any other suitable material. A soft metal sleeve 42 may be inserted into the axle hole of the composite and plastic materials for added strength. A first natural bend of each composite tube 40, 42 may be found. With reference to FIG. 4a, a first natural bend 55 of each composite tube 40, 42 is aligned, such that the first natural bends 55 of composite tubes 40, 42 of a first limb faces the first natural bend 55 of two opposing composite tubes 40, 42 of a second limb.

Figure 8:
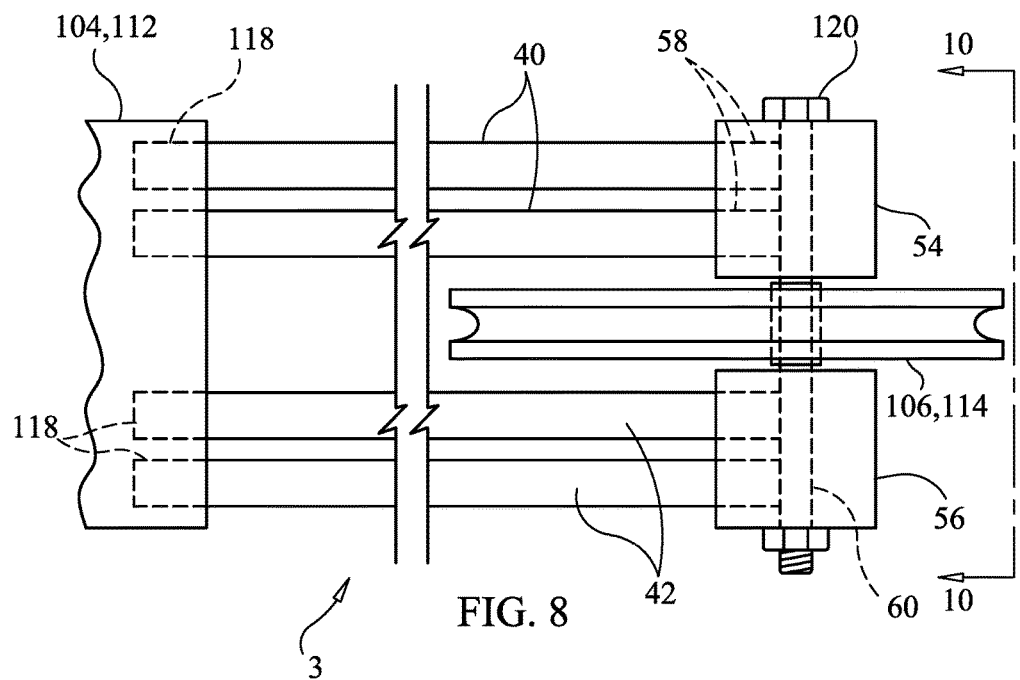
FIG. 8 is a top view of an archery bow limb having four composite tubes for each limb in accordance with the present invention.
Figures 9, 10:
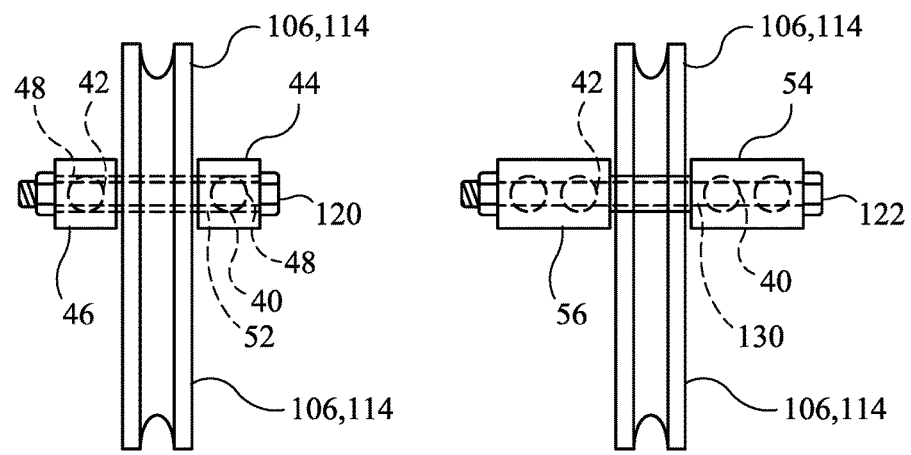
FIG. 9 is an end view of first and second cam blocks retaining a cam axle of an archery bow limb having two composite tubes for each limb in accordance with the present invention.
FIG. 10 is an end view of first and second cam blocks retaining a cam axle of an archery bow limb having four composite tubes for each limb in accordance with the present invention.

With reference to FIGS. 8 and 9, an archery bow limb 3 includes two first limb tubes 40, two second limb tubes 42, a first cam block 54 and a second cam block 56. Four riser tube holes 118 are formed in the riser 104, 112 of the archery bow 100, 102 to receive one end of the first and second limb tubes 40, 42. Each cam block (cam bracket) 54, 56 includes two tube holes 58, which are sized to receive the other end of the first and second limb tubes 40, 42. An axle hole 60 is formed perpendicular to the two tube holes 58 to receive a cam axle 122. Each end of the first and second composite tubes 40, 42 is preferably secured in the riser tube holes 118 and tube holes 58 with adhesive or the like. The first and second cam blocks 54, 56 may be fabricated from a composite material, a plastic material, a lightweight metal or any other suitable material. A soft metal sleeve may be inserted into the axle hole of the composite and plastic materials for added strength. A first natural bend of the composite tubes 40, 42 may be found. The first natural bend 55 of each composite tube 40, 42 is aligned, such that the first natural bends 55 of composite tubes 40, 42 of a first limb faces the first natural bend 55 of opposing composite tubes 40, 42 of a second limb.

Figure 7A:
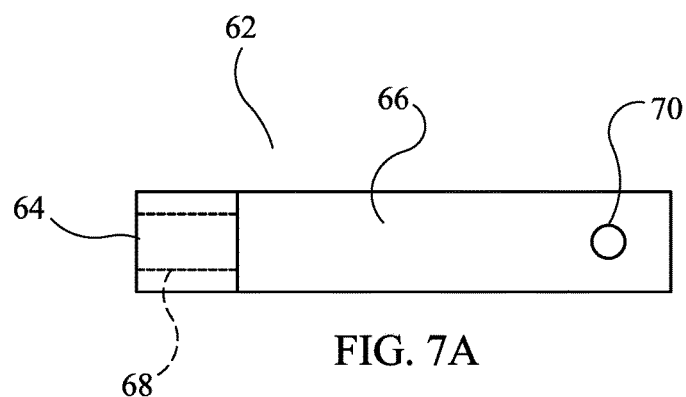
FIG. 7A is a side view of a cam bracket of a second embodiment of an archery bow limb having at least one composite tube in accordance with the present invention.

With reference to FIGS. 7-7a, a second embodiment of the composite tube limb 4 preferably includes the first limb tube 40, the second limb tube 42 and a cam bracket 62. The cam bracket 62 preferably includes a tube base 64 and an axle plate 66. The axle plate 66 extends outward from the tube base 64. Two tube holes 68 are formed in the tube base 64 to receive the other end of the first and second limb tubes 40, 42. An axle hole 70 is formed perpendicular to the two tube holes 68 to receive one end of a cam axle 124. Each end of the first and second composite tubes 40, 42 is preferably secured in the riser tube holes 118 and tube holes 68 with adhesive or the like. The cam bracket 62 may be fabricated from a composite material, a plastic material, a lightweight metal or any other suitable material. A soft metal sleeve may be inserted into the axle hole of the composite and plastic materials for added strength.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A composite tube comprising:
   a first fiber sheet having a plurality of first fibers in a first axis and a plurality of second fibers in a second axis, said first axis of said first fiber sheet is parallel to a lengthwise axis of the composite tube, said plurality of second fibers of said first fiber sheet cross said plurality of said first fibers of said first fiber sheet;

a second fiber sheet having a plurality of first fibers in a first axis are parallel to said lengthwise axis of said composite tube;

a third fiber sheet having a plurality of first fibers in a first axis and a plurality of second fibers in a second axis, said plurality of second fibers cross said plurality of said first fibers of said third fiber sheet, said first axis of said third fiber sheet is oriented about 45 degrees relative to said lengthwise axis; and a fourth fiber sheet having a plurality of first fibers in a first axis and a plurality of second fibers in a second axis, said first axis of said fourth fiber sheet is parallel to said lengthwise axis, said plurality of second fibers of said fourth fiber sheet cross said plurality of said first fibers of said fourth fiber sheet.

2. The composite tube of claim 1 wherein:
a spacing between said plurality of fibers of said first, second, third and fourth fiber sheets are all the same.

3. The composite tube of claim 1 wherein:
a spacing between said plurality of fibers of only two of said first, second, third and fourth fiber sheets are the same.

4. The composite tube of claim 1 wherein:
said fiber is at least one of carbon, boron, ceramic, titanium, fiberglass, Kevlar, Spectra and Dyneema.

5. The composite tube of claim 1 wherein:
said composite tube is an arrow shaft.

6. The composite tube of claim 1, further comprising:
a first limb includes at least one said composite tube;
a second limb includes at least one second composite tube; and
one end of said first limb is secured to a first end of a riser of an archery bow, one end of said second limb is secured to a second end of the riser of the archery bow, wherein a first cam is rotatably retained on an opposing end of said first limb, a second cam is rotatably retained on an opposing end of said second limb.

7. The composite tube of claim 6, further comprising:
at least one first cam bracket is attached to an opposing end of said first limb, at least one second cam bracket is attached to an opposing end of said second limb, wherein the first cam is rotatably retained on said at least one first cam bracket, the second cam is rotatably retained on said at least one second cam bracket.

8. A composite tube comprising:
a first fiber sheet having a plurality of first fibers in a first axis and a plurality of second fibers in a second axis, said first axis of said first fiber sheet is parallel to a lengthwise axis of the composite tube, said plurality of second fibers of said first fiber sheet cross said plurality of said first fibers of said first fiber sheet at angle of about 90 degrees;

a second fiber sheet having a plurality of first fibers in a first axis are parallel to said lengthwise axis of said composite tube;

a third fiber sheet having a plurality of first fibers in a first axis and a plurality of second fibers in a second axis, said plurality of second fibers cross said plurality of said first fibers of said third fiber sheet at angle of about 90 degrees, said first axis of said third fiber sheet is oriented about 45 degrees relative to said lengthwise axis; and a fourth fiber sheet having a plurality of first fibers in a first axis and a plurality of second fibers in a second axis, said first axis of said fourth fiber sheet is parallel to said lengthwise axis, said plurality of second fibers of said fourth sheet cross said plurality of said first fibers of said fourth fiber sheet at an angle of about 90 degrees.

9. The composite tube of claim 8 wherein:
a spacing between said plurality of fibers of said first, second, third and fourth fiber sheets are all the same.

10. The composite tube of claim 8 wherein:
a spacing between said plurality of fibers of only two of said first, second, third and fourth fiber sheets are the same.

11. The composite tube of claim 8 wherein:
said fiber is at least one of carbon, boron, ceramic, titanium, fiberglass, Kevlar, Spectra and Dyneema.

12. The composite tube of claim 8 wherein:
said composite tube is an arrow shaft.

13. The composite tube of claim 8, further comprising:
a first limb includes at least one said composite tube;
a second limb includes at least one second composite tube; and
one end of said first limb is secured to a first end of a riser of an archery bow, one end of said second limb is secured to a second end of the riser of the archery bow, wherein a first cam is rotatably retained on an opposing end of said first limb, a second cam is rotatably retained on an opposing end of said second limb.

14. The composite tube of claim 8, further comprising:
at least one first cam bracket is attached to an opposing end of said first limb, at least one second cam bracket is attached to an opposing end of said second limb, wherein the first cam is rotatably retained on said at least one first cam bracket, the second cam is rotatably retained on said at least one second cam bracket.

15. A composite tube comprising:
a first fiber sheet having a plurality of first fibers in a first axis and a plurality of second fibers in a second axis, said first axis of said first fiber sheet forms a lengthwise axis of a composite tube, said plurality of second fibers of said first fiber sheet cross said plurality of said first fibers of said first fiber sheet;

a second fiber sheet having a plurality of first fibers in a first axis are parallel to said lengthwise axis of said composite tube;

a third fiber sheet having a plurality of first fibers in a first axis and a plurality of second fibers in a second axis, said plurality of second fibers cross said plurality of said first fibers of said third fiber sheet, said first axis of said third fiber sheet is oriented about 45 degrees relative to said lengthwise axis; and a fourth fiber sheet having a plurality of first fibers in a first axis and a plurality of second fibers in a second axis, said first axis of said fourth fiber sheet is aligned with a lengthwise axis of said composite tube, said plurality of second fibers cross said plurality of said first fibers of said fourth fiber sheet, wherein said first fiber sheet is wrapped around a mandrill, said second fiber sheet is wrapped around said first fiber sheet, said third fiber sheet is wrapped around said second fiber sheet, said second fiber sheet is wrapped around said third fiber sheet, the mandrill with said first, second, third and fourth fiber sheets is baked in an autoclave.

16. The composite tube of claim 15 wherein:
a spacing between said plurality of fibers of said first, second, third and fourth fiber sheets are all the same.

17. The composite tube of claim 16, further comprising:
a first limb includes at least one said composite tube;

a second limb includes at least one second composite tube; and one end of said first limb is secured to a first end of a riser of an archery bow, one end of said second limb is secured to a second end of the riser of the archery bow, wherein a first cam is rotatably retained on an opposing end of said first limb, a second cam is rotatably retained on an opposing end of said second limb.

18. The composite tube of claim 15 wherein:

a spacing between said plurality of fibers of only two of said first, second, third and fourth fiber sheets are the same.

19. The composite tube of claim 15 wherein:

said fiber is at least one of carbon, boron, ceramic, titanium, fiberglass, Kevlar, Spectra and Dyneema.

20. The composite tube of claim 15 wherein:

said composite tube is an arrow shaft.

\* \* \* \* \*